Figure 1:
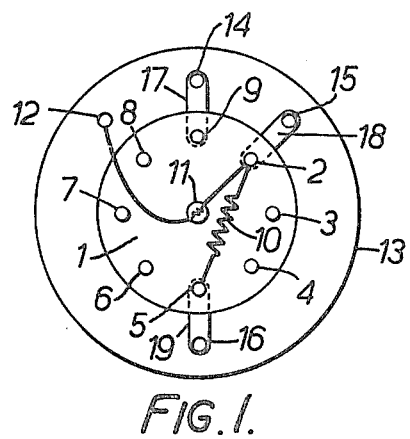

United States Patent [19]

Scholz et al.

[11] 4,246,516
[45] Jan. 20, 1981

[54] LIGHT BIASSED CAMERA TUBE ARRANGEMENTS

[75] Inventors: Hans Scholz, Maldon; David G. Holland, Braintree, both of England

[73] Assignee: English Electric Valve Company Limited, Chelmsford, England

[21] Appl. No.: 936,636

[22] Filed: Aug. 24, 1978

[30] Foreign Application Priority Data

Aug. 25, 1977 [GB] United Kingdom ............... 35799/77

[51] Int. Cl.³ ............................................. H01J 29/98
[52] U.S. Cl. ..................................... 315/291; 313/51; 313/318; 313/371; 313/478; 315/3; 339/17 D; 339/144 T
[58] Field of Search ..................... 315/3, 94, 291, 292; 358/212, 213, 221; 313/49, 51, 318, 371, 372, 384, 478; 339/17 D, 144 T, 145 T

[56] References Cited

U.S. PATENT DOCUMENTS

| 3,925,699 | 12/1975 | Banks et al. | 313/384 |
| 3,986,070 | 10/1976 | Scholz | 313/371 X |
| 4,106,840 | 8/1978 | Tyson | 313/318 X |

Primary Examiner—Eugene R. LaRoche
Attorney, Agent, or Firm—Diller, Ramik & Wight

[57] ABSTRACT

The invention relates to light biassed camera tube arrangements of the kind in which the light bias source within the overall outline of the tube envelope has one terminal connected to a heater pin in order to provide a source of power. The other terminal of the light bias source is connected to a lead extending to a terminal carried by a protecive end base cap for the tube and a removable disc is provided to fit between the base of the tube and a valve base into which the tube is plugged, the removable disc bearing circuitry and terminals provided to contact selected ones of the terminals carried by the protective end base cap so that the nature of the light bias provided may be selected.

8 Claims, 6 Drawing Figures

LIGHT BIASSED CAMERA TUBE ARRANGEMENTS

This invention relates to light biassed camera tube arrangements.

It is well known to provide light biassing of the target of a camera tube, particularly where the target is comprised of lead monoxide. Examples of such camera tube arrangements are for example described in the specification of our U.K. Pat. No. 1,299,288.

The present invention is particularly concerned with light biassed camera tube arrangements of the kind wherein the light bias source is positioned within the overall outline of the tube envelope—e.g. within the vacuum thereof or in a cavity extending into the tube envelope but sealed against the vacuum thereof so as to enable access to be gained to the light bias source without disturbing the sealing of the tube envelope.

Commonly the level of light bias is fixed, in which case conveniently the light bias source is usually run in parallel with the heater of the camera tube. Quite often, however it is advantageous to provide for the level of light bias to be variable, in which case one end of the light bias source is often connected to one of the heater pins of the tube and a separate connection is provided to the other end of the light bias source so that the supply to the latter may be controlled.

The present invention seeks to provide an improved light biassed camera tube arrangement of the kind referred to in which the operator may relatively readily select the nature of the light bias provided.

According to this invention a light biased camera tube arrangement comprises a light biassed camera tube having a plurality of connecting pins extending through its base of which two are heater pins connected internally to supply a cathode heater and of which one of said two is connected to one end of a light bias source provided within the overall outline of the tube envelope with the other end of said light bias source being connected to a lead extending to a terminal carried by a protective end base cap for said tube, and wherein said protective base end cap is provided with at least two further terminals, one connected to one of said heater pins and the other to the other and wherein a removable disc is provided to fit between the base of said tube and a valve base into which said tube is fitted in use, said removable disc bearing circuitry and terminals adapted to contact selective ones of the terminals carried by said protective base end cap whereby the nature of said light bias provided is determined.

Preferably said terminals carried by said protective base end cap are sockets and said terminals borne by said removable disc are co-operative plugs.

In one form said removable disc bears circuitry by which said terminal on said protective base end cap, to which said other end of said internal light bias source is connected, is connected, preferably via a series resistor borne by said removable disc, to that one of said two further terminals carried by said protective base end cap to which said other of said two heater pins is connected. Preferably, in said one form said removable disc also bears a shunt resistor which is connected between the said two further terminals on said protective base end cap to which said heater is connected. In this one form, the fitment of said removable disc between the base of said tube and the valve base into which it fits in use provides for fixed light bias.

In another form a yet further terminal is carried by said protective end base cap to which is connected the index pin of said tube, to which normally no internal connection is made, and said removable disc bears circuitry connecting said terminal carried by said protective end base cap to which the other end of said light bias source is connected and said yet further terminal carried by said protective end base cap. In this form the presence of said removable disc between the protective base end cap of said tube and a valve base into which the tube is fitted in use provides for variable light bias, since a variable supply may be applied to said light bias source via said index pin.

Whilst not essential, another form of removable disc which may be provided is one bearing terminals co-operating with terminals carried by said protective base end cap but no circuitry whereby said removable disc is provided to act purely as a spacer.

In one embodiment of the invention said removable disc is of alumina and said circuitry, and any resistor borne thereby, is printed.

In another embodiment of the invention said removable disc is a printed circuit board and any resistor borne thereby is a discrete resistor.

In this last mentioned case, preferably on said disc two portions of conductive tracking between which a resistor is connected extend co-axially over part of their lengths whereby one or more resistors may conveniently be connected therebetween to adjust the value of the resistance provided.

Figure 2:
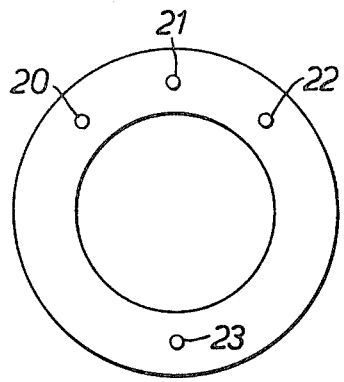
Figure 3:
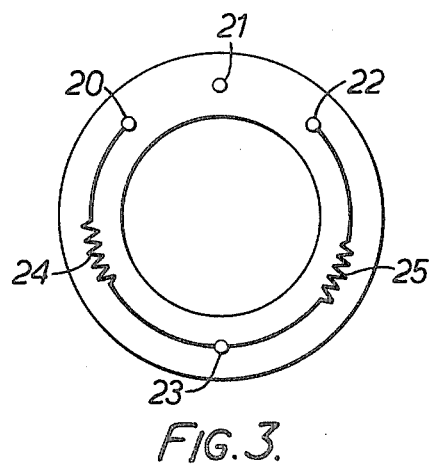
Figure 4:
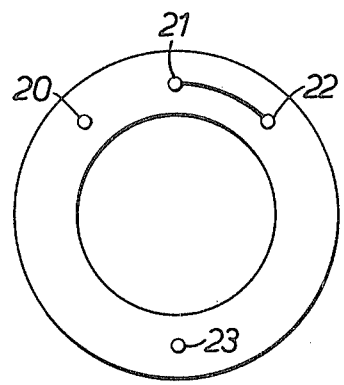
Figure 5:
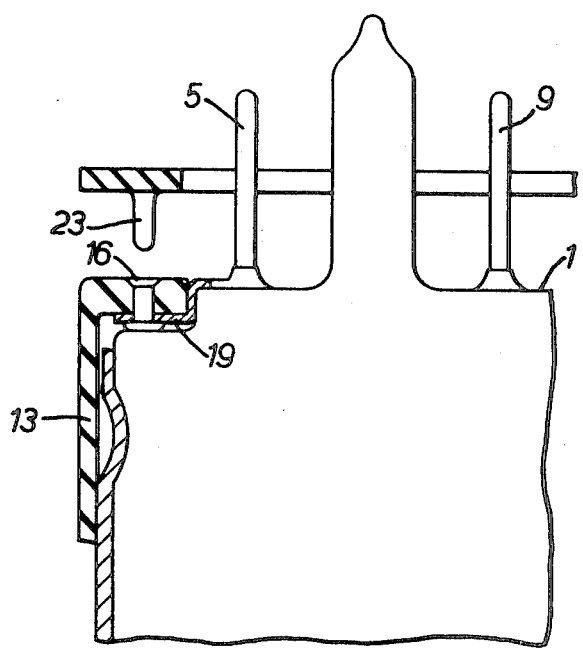
Figure 6:
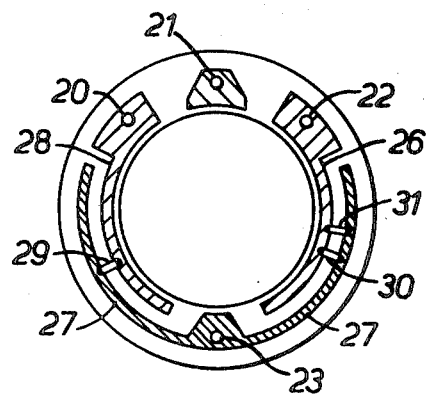

The invention is illustrated in and further described with reference to the accompanying drawings in which, FIG. 1 is a plan view of the base end of a camera tube arrangement in accordance with the present invention, FIGS. 2, 3 and 4 are plan views of different removable discs which in accordance with the present invention may be inserted between the base end of the camera tube shown in FIG. 1 and a valve base therefor, FIG. 5 is a part sectional view illustrating the positioning of a removable disc such as that illustrated in FIGS. 2, 3 or 4 in relation to the camera tube base, and FIG. 6 illustrates another arrangement in accordance with the present invention.

In all Figures, like references are used for like parts.

Referring to FIG. 1 the base end of the camera tube is shown at 1. Extending through the base 1 of the camera tube are eight pins referenced 2 to 9. Pins 2 and 5 are connected internally to the heater of the camera tube, which heater is schematically represented at 10. Pin 9 is the index pin of the camera tube and is not connected internally to any electrode of the camera tube. The remaining ones of the pins 2 to 9 serve to supply the various electrodes of the tube, as known per se.

Also schematically represented is a light bias source 11 which, in this example, is located in a cavity extending into the envelope of the tube, but sealed against the vacuum thereof, so that light bias source 11 is accessable without disturbing the sealing of the tube, as described in the specification of our U.K. Pat. No. 1,333,547. One end of the light bias source 11 is connected to heater pin 2 whilst the other end of the light bias source 11 is connected to a socket 12 carried by the protective base end cap 13 of the tube. Also carried by the protective base end cap of the tube are further sockets 14, 15 and 16 which are connected respectively by conductors 17, 18 and 19 to the pins 9, 2 and 5 respectively of the camera tube.

As so far described, if the tube illustrated in FIG. 1 is plugged into its normal valve base the light bias source 11 will be open circuited at one end and no light bias will be provided.

However, three interchangeable removable discs are provided, as illustrated in FIGS. 2, 3 and 4, each of which bears plugs 20, 21, 22 and 23 arranged to unite with the sockets 15, 14, 12 and 16 respectively carried by the protective end base cap 13 shown in FIG. 1.

The removable disc illustrated in FIG. 2 it will be noted, merely possesses the plugs 20 to 23. In use, this removable disc will act merely as a spacer and will result in no light bias being provided.

Referring to the removable disc shown in FIG. 3 it will be noted that this bears circuit connections between plugs 20 and 23, via a shunt resistor 24 and between plugs 22 and 23, via a series resistor 25. Using this removable plug it will be appreciated that the end of the light bias source 11 connected to socket 12 will be fed via series resistor 25, plug and socket 23 and 16 and the heater pin 5, to provide a fixed level of bias determined by the values of the series resistor 25. The shunt resistor 24 which is, at the same time, connected in parallel with heater 10 maintains the overall power consumption at a standard level.

Referring to FIG. 4 it will be seen that circuit connections are provided between plug 21 and plug 22. Using this removable disc the end of the light source 11 which is connected to the socket 12 is connected via plug and socket 21 and 14 to the index pin 9 to which a variable supply may be connected to permit variable light bias.

Referring to FIG. 5 it is believed that this will be largely self-explanatory. This shows one of the removable discs shown in FIG. 2, 3 or 4 being offered up to the base 1 and protective end cap 13 of the camera tube. The plug 23 is shown about to enter the socket 16. FIG. 5 also illustrates the arrangement of link 19. The arrangement of the remaining plugs, sockets and links is similar.

Thus by the simple expedient of plugging a chosen one of the removable discs shown in FIGS. 2 to 4 into a protective base end cap 13 of the tube the nature of the light bias provided may be selected as required. As had already been mentioned it is not necessary to use the removable disc shown in FIG. 2 when no light bias of any sort is required, but this may be used if one requires the use of a spacer.

In the example described above, the removable discs are of alumina and any circuit connections and resistors borne thereby are formed by printing as known per se.

However, in another example of the present invention the discs are printed circuit boards and any resistors borne thereby are discrete. Otherwise the general arrangement is similar. One example of a printed circuit disc is illustrated in FIG. 6. This disc corresponds to the disc shown in FIG. 3.

Referring to FIG. 6, it will be seen that plug 22 is electrically connected to a portion of circular conductive track 26, plug 23 is electrically connected to a portion of conductive track 27 and plug 20 is electrically connected to a portion of conductive track 28.

Part of the length of track 27 extends co-axially with part of the length of track 28 and another part of the length of track 27 extends co-axially with part of the length of track 26. Between track 27 and track 28 is connected a micro-resistor 29 (corresponding to resistor 24 of FIG. 3) and between track 27 and track 26 is connected a micro-resistor 30 (corresponding to resistor 25 of FIG. 3). A further micro-resistor 31 is shown connected between track 27 and track 26 provided to adjust the value of resistance provided.

We claim:

1. A light biassed camera tube arrangement comprising a light biassed camera tube having a plurality of connecting pins extending through its base of which two are heater pins connected internally to supply a cathode heater and of which one of said two is connected to one end of a light bias source provided within the overall outline of the tube envelope with the other end of said light bias source being connected to a lead extending to a terminal carried by a protective end base cap for said tube, and wherein said protective base end cap is provided with at least two further terminals, one of said two further terminals being connected to said one of said heater pins and the other of said two further terminals being connected to the other of said heater pins and wherein a removable disc is provided to fit between the base of said tube and a valve base into which said tube is fitted in use, said removable disc bearing circuitry by which said terminal on said protective base end cap, to which said other end of said internal light bias source is connected, is connected to that one of said two further terminals carried by said protective base end cap to which said other of said two heater pins is connected.

2. An arrangement as claimed in claim 1 and wherein said circuitry comprises a series resistor borne by said removable disc.

3. An arrangement as claimed in claim 1 and wherein said circuitry also comprises a shunt resistor which is connected between the said two further terminals on said protective base end cap to which said heater is connected.

4. A light biassed camera tube arrangement comprising a light biassed camera tube having a plurality of connecting pins extending through its base of which two are heater pins connected internally to supply a cathode heater and of which one of said two is connected to one end of a light bias source provided within the overall outline of the tube envelope with the other end of said light bias source being connected to a lead extending to a terminal carried by a protective end base cap for said tube, and wherein said protective base end cap is provided with at least two further terminals, one of said two further terminals being connected to said one of said heater pins and the other of said two further terminals being connected to the other of said heater pins and wherein a removable disc is provided to fit between the base of said tube and a valve base into which said tube is fitted in use, wherein a yet further terminal is carried by said protective end base to which is connected the index pin of said tube, to which index pin normally no internal connection is made, said removable disc bearing circuitry connecting said terminal carried by said protective end base cap to which the other end of said light source is connected and said yet further terminal carried by said protective end base cap, and a source of variable bias connected to said index pin.

5. An arrangement as claimed in claim 1 or 4 and wherein said terminals carried by said protective base end cap are sockets and said terminals borne by said removable disc are co-operative plugs.

6. An arrangement as claimed in claim 1 or 4 wherein said removable disc is of alumina and said circuitry is printed.

7. An arrangement as claimed in claim 1 or 4 and wherein said removable disc is a printed circuit board and any resistor borne thereby is a discrete resistor.

8. An arrangement as claimed in claim 7 and wherein on said disc two portions of conductive tracking between which a resistor is connected extend co-axially over part of their lengths whereby one or more resistors may conveniently be connected therebetween to adjust the value of the resistance provided.

* * * * *